United States Patent
Lee et al.

(10) Patent No.: US 9,712,368 B2
(45) Date of Patent: Jul. 18, 2017

(54) DIFFERENTIAL CURRENT MODE LOW LATENCY MODULATION AND DEMODULATION FOR CHIP-TO-CHIP CONNECTION

(71) Applicant: THE REGENTS OF THE UNIVERSITY OF CALIFORNIA, Oakland, CA (US)

(72) Inventors: Sheau Jiung Lee, Saratoga, CA (US); Mau-Chung Frank Chang, Los Angeles, CA (US); Wei-Han Cho, Los Angeles, CA (US); Yanghyo Kim, Culver City, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 14/935,117

(22) Filed: Nov. 6, 2015

(65) Prior Publication Data
US 2016/0134460 A1 May 12, 2016

Related U.S. Application Data

(63) Continuation of application No. PCT/US2014/035533, filed on Apr. 25, 2014.
(Continued)

(51) Int. Cl.
*H04L 5/12* (2006.01)
*H04L 23/02* (2006.01)
(Continued)

(52) U.S. Cl.
CPC .............. *H04L 27/362* (2013.01); *H04L 5/06* (2013.01); *H04L 25/0282* (2013.01); *H04L 25/0294* (2013.01); *H04L 27/38* (2013.01)

(58) Field of Classification Search
CPC ....... H04L 27/38; H04L 27/362; H04L 27/34; H04L 27/04
See application file for complete search history.

(56) References Cited

U.S. PATENT DOCUMENTS 9,401,828 B2 * 7/2016 Cronie ............... H04L 25/0276
2002/0172290 A1 * 11/2002 Chorpenning .... H04L 12/40052
375/257

(Continued)

OTHER PUBLICATIONS

Korean Intellectual Property Office (KIPO), International Search Report and Written Opinion, Aug. 26, 2014, PCT/US2014/035533, pp. 1-10, with claims searched, pp. 11-16. Counterpart to the application filed herein.
(Continued)

*Primary Examiner* — Daniel Washburn
*Assistant Examiner* — Amneet Singh
(74) *Attorney, Agent, or Firm* — O'Banion & Ritchey LLP; John P. O'Banion

(57) ABSTRACT

A chip-to-chip communications circuit which is particularly well-suited for short range communication (less than a few inches) from one integrated circuit (chip) to another is presented. The circuits preferably utilize multi-frequency quadrature amplitude modulation (QAM) mechanisms for converting digital data bits from a parallel form into a serial analog stream for communication over a chip I/O connection. Differential current mode modulation in the transmitter, and demodulation in the receiver, are utilized which reduce latency and power-consumption while increasing manufacturing yields and resilience to process variations.

24 Claims, 4 Drawing Sheets

Related U.S. Application Data

(60) Provisional application No. 61/821,702, filed on May 9, 2013.

(51) Int. Cl.
    *H04L 27/36*     (2006.01)
    *H04L 27/38*     (2006.01)
    *H04L 5/06*     (2006.01)
    *H04L 25/02*     (2006.01)

(56) References Cited

U.S. PATENT DOCUMENTS

| | | |
|---|---|---|
| 2007/0132485 A1 | 6/2007 | Alon et al. |
| 2008/0123515 A1 | 5/2008 | Boehlke et al. |
| 2009/0058475 A1 | 3/2009 | Jung |
| 2011/0124306 A1 | 5/2011 | Litmanen et al. |
| 2012/0007756 A1 | 1/2012 | Agazzi |
| 2012/0163627 A1 | 6/2012 | Goodson et al. |

OTHER PUBLICATIONS

The State Intellectual Property Office of the People's Republic of China, Notice of First Office Action, Jul. 6, 2016, related CN Patent Application No. 201480024481.4, English translation (pp. 1-7), claims examined (pp. 8-13), original Chinese language communication (pp. 14-19).

European Patent Office (EPO), The Extended European Search Report, issued Oct. 26, 2016, related EP Application No. 14795450.7, pp. 1-9, with claims searched, pp. 10-13.

Hang, M.-C. Frank, "Multiband RF-interconnect for CMP inter-core communications", Solid-State and Integrated-Circuit Technology, 2008, ICSICT 2008, 9th International Conference on, IEEE, Piscataway, NJ, USA, Oct. 20, 2008, (Oct. 20, 2008), pp. 1811-1814, XP031384634, ISBN: 978-1-4244-2185-5.

State Intellectual Property Office of the P.R.C. (SIPO), Office Action issued Jan. 24, 2017, related Chinese Patent Application No. CN 201480024481.4, pp. 1-5, machine translation, pp. 6-8, claims examined, pp. 9-14.

\* cited by examiner

DIFFERENTIAL CURRENT MODE LOW LATENCY MODULATION AND DEMODULATION FOR CHIP-TO-CHIP CONNECTION

CROSS-REFERENCE TO RELATED APPLICATIONS

This application is a 35 U.S.C. §111(a) continuation of PCT international application number PCT/US2014/035533 filed on Apr. 25, 2014, incorporated herein by reference in its entirety, which claims priority to, and the benefit of, U.S. provisional patent application Ser. No. 61/821,702 filed on May 9, 2013, incorporated herein by reference in its entirety. Priority is claimed to each of the foregoing applications.

The above-referenced PCT international application was published as PCT International Publication No. WO 2014/182474 on Nov. 13, 2014, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technical Field

This technology pertains generally to chip-to-chip communication, and more particularly to short-range chip-to-chip communication using differential current mode multiple-frequency modulation-demodulation.

2. Background Discussion

Conventional serial I/O is based on multiplexing and demultiplexing digital communications. To increase communications bandwidth using these conventional schemes, one first turns to increasing the clock rate. However, each process technology has its own limitations on clock rates, whereby one must often increase the number of I/O connections to increase the bandwidth, and as a result manufacturing costs increase. These costs are even further increased in 3D integrated circuit integration, such as those based on through-substrate-via (TSV) for vertical interconnections. The number of TSVs for the I/O is non-scalable due to fundamental physical or mechanical constraints. Higher than a certain number of TSVs per unit area (or population density) leads to thinned Si substrate (about 100 µm/tier) which can result in collapse. Therefore, this thinning can seriously limit inter-tier communication bandwidth in 3D integrated circuits.

Thus, chip-to-chip communication circuits with higher communication bandwidths have been sought which do not require concurrent increases in the clock rate or additional I/O connections. Traditional chip-to-chip communication connections rely on voltage signaling over interconnected metal wires. Even advanced approaches for communication between chips, such as multi-frequency-band quadrature amplitude modulation (QAM) circuits for chip-to-chip connections as taught by the inventors in the previous application (provides high bandwidths without increased clock rates or added I/O connections), includes the use of voltage signals with or without termination.

These existing methods for implementing multiband or QAM modulation and demodulation circuits are targeted for long distance communications. This is because the distance between communications is long and extensive power amplifiers and low noise amplifiers can be used for transmitting or receiving communication signals in voltage mode instead of in current mode.

Accordingly, the present technology provides enhanced chip-to-chip communications for short interchip distances of a few inches or less.

BRIEF SUMMARY OF THE TECHNOLOGY

A novel differential current mode modulation-demodulation method is presented which provides lower (shorter) latency, lower power consumption, higher manufacturing yields, while simultaneously providing resilience to process variations, such as for multi-frequency band QAM transceiver circuits. Our novel differential current mode modulation-demodulation method/apparatus can be applied in a number of applications requiring short-distance inter-chip communication, and is particularly well-suited as a foundation for chip-to-chip connection in three-dimensional integrated circuits through vertical TSV interconnects.

The modulation and demodulation is performed based on differential current mode operation and includes a DC current reduction circuit element to improve the signal-to-noise ratio (SNR). Our circuits are preferably implemented using current mirrors with proven higher manufacturing yield. A current mode Schmitt Trigger with adjustable hysteresis value is included in the demodulation circuit to improve the data recovery without creating the bit error.

Further aspects of the technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology will be more fully understood by reference to the following drawings which are for illustrative purposes only:

DETAILED DESCRIPTION OF THE TECHNOLOGY

Figure 1:
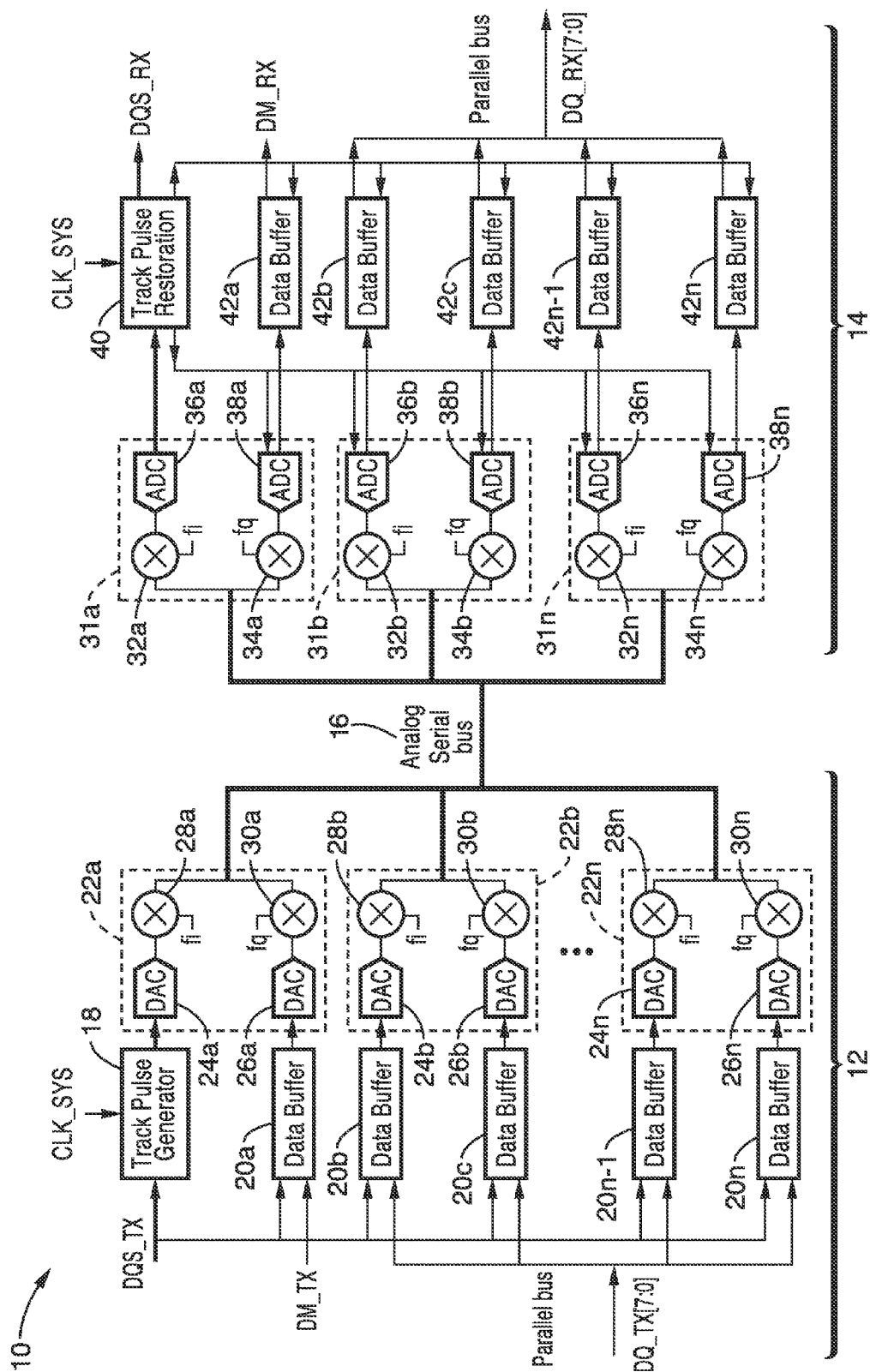
FIG. 1 is a schematic block diagram for a short distance modulation and demodulation communication apparatus according to an embodiment of the present technology.

The technology generally provides a new form of chip-to-chip communication, which applies modulation-demodulation to a differential current flow when inter-chip communication distance is less than several inches (such as three inches), and more preferably less than approximately three inches. Our apparatus, system and method provides a number of advantages, including lower power, lower latency, higher interference tolerance between neighboring through-Silicon-vias (TSVs) and increased tolerance to fabrication process variations than are provided by existing voltage signaling with either single-ended or differential modes.

In addition, our current signaling is based on the difference of current flows instead of their absolute values. Since the connection TSV-pin-pair of the source chip sums current flows from the modulation circuit, exemplified as multiband quadrature-amplitude modulation (QAM) circuits, before delivering it to the receiver chip, the DC (direct current) level of differential current flows becomes high. It should be appreciated that the differential current can also be configured according to the present technology using a low frequency AC, which can be distinguished from the higher frequency of the modulated signals. The receiver chip will not only bear unnecessary DC power consumption but also render the ratio lower between its differential signal and background DC current. In view of this problem, our circuit architecture self-adjusts the DC current to remove undesired differential DC current mode for maintaining the enhanced signal-to-background ratio and reduced power consumption.

Additionally, our communications circuit overcomes chip fabrication process variations leading to DC current level change, by incorporating a self-adjusting DC reduction circuit that removes undesired DC current components induced by process variations. Our circuit offers a beneficially more robust manner for differential current mode signals to be communicated between chips despite unknown levels of manufacturing process variations.

The input impedance of the our receiver chip is lower when operating in the current mode compared with that of voltage mode operations. Thus, the source (transmitter) chip is subject to a lighter loading in current mode operation which leads to higher speeds, even under conditions of large capacitance loading. Moreover, the interference noise generated by neighboring TSVs, which is principally in voltage mode with its current decreasing substantially in magnitude after traveling through the conductive silicon substrate. The lowered current noise allows one to implement receiver circuits with even lower current for further reduced power consumption.

In the short-range application of the technology, it should be appreciated that inter-chip connection, such as through three-dimensional integrated circuit (3DIC) vertical TSVs, is within a few inches (e.g., three inches), while it may be down to less than one-tenth of an inch. This allows one to apply the current mode operation as the communication signaling. Furthermore, in order to tolerate the noise or interference from unexpected sources, utilizing differential current can improve robustness and efficiency of communication. In addition to applying the differential current as the signal to be modulated or demodulated, a self-adjusting DC current reduction circuit is incorporated which not only improves signal-to-noise ratio (SNR), but also reduces the power consumption toward overcoming manufacturing process variations.

FIG. 1 illustrates an example embodiment 10, of circuit blocks for a modulation and demodulation communication circuit utilizing multi-frequency band quadrature-amplitude modulation (QAM) circuit to connect multiple chips within a short distance.

The modulation and demodulation circuit 10 comprises modulation circuits to perform transmission (TX) 12, and demodulation circuits to perform reception (RX) 14, between which are seen a communication connection 16, in the form of an analog serial bus.

Transmit side 12 is shown receiving data over a data bus, exemplified as, but not limited to, an 8-bit wide bus (DQ_TX [7:0]), a device mode signal (DM_TX), a transmitter latching signal DQS_TX, and a clock signal (CLK_SYS). In the modulator of the transmission side are seen a track pulse generator 18 that is seen coupled in a first stage with a plurality of data buffers 20a through 20n. Output from the pulse generator 18 and data buffers 20a-20n, is seen received by QAM circuits 22a through 22n. Track pulse generation provides a mechanism for synchronization between the transmitter and receiver. A track pulse is transmitted to the receiver which is utilized for controlling the data buffers for the DM_RX bit as well as for data bits DQ_RX[7:0]. Each QAM circuit (22a through 22n), is seen exemplified as comprising digital-to-analog converters (DACs) 24a, 26a, 24b, 26b, . . . 24n, 26n, followed by mixers (current mode) 28a, 30a, 28b, 30b, . . . 28n, 30n, with each pair of mixers receiving an $f_i$ and $f_q$ signal. It will be appreciated that the DACs depicted are configured for outputting differential current mode output signals, which is then modulated by the current mode mixers.

Receive side 14 is shown with similar signals as were seen in the transmit side, while it outputs data over a data bus, exemplified, but not limited to, an 8-bit wide bus (DQ_RX [7:0]), outputs a device mode signal (DM_RX), an output status signal DQS_RX, and a clock signal (CLK_SYS). The demodulation circuit in the receiver 14 is substantially the reverse of that seen in transmit side 12. A signal is received from analog serial bus 16 to a number of QAM circuits 31a, 31b, . . . 31n, comprising mixers 32a, 34a, 32b, 34b, . . . 32n, 34n, each pair receiving $f_i$, and $f_q$ signals. Output from the mixers is converted to digital signals by pairs of analog-to-digital converters (ADC) 36a, 38a, 36b, 38b, . . . 36n, 38n, with each mixer output coupled to the input of the ADC. Digital outputs from the ADCs are received at a track pulse restoration circuit 40 along with data buffers 42a, 42b, 42c, . . . 42n−1, 42n. The output of track pulse restoration circuit 40 is output as DQS_RX, and another portion connected to each of the data buffers 42a, 42b, 42c, . . . 42n−1, 42n. Output from the first data buffer 42a, generates signal DM_RX, while output from the remaining data buffers is output on signal DQ_RX[7:0].

The circuit transmits a byte of digital signals after applying multi-frequency modulation and combining mixer outputs to transmit a modulated multi-frequency analog transmission from transmitter 12. The receiver circuit 14 receives this multi-frequency analog signal and applies a multi-frequency demodulation to the combined signal from transmitter 12 from which it extracts the digital data as was originally received by transmitter 12.

The circuit transmits the differential current signal after converting the digital voltage signal by the digital-to-analog converter (24a, 26a, 24b, 26b, ... 24n, 26n). It should be appreciated that although the DAC is described for differential current mode output, the circuit can be alternatively implemented with a circuit following the DAC which converts voltage level signals to differential current mode outputs. Differential current signals generated by the DACs are then modulated by applying defined frequency carrier signals ($f_i$ and $f_q$) at the mixer (28a, 30a, 28b, 30b, ... 28n, 30n) whose combined signal is sent through connection pins through serial bus 16.

In a complementary manner, the circuits receiving the differential current signal from TX will be sent to the mixer (32a, 34a, 32b, 34b, ... 32n, 34n) for demodulation and conversion by ADC (36a, 38a, 36b, 38b, ... 36n, 38n) and then buffering (40, 42a, 42b, 42c, ... 42n−1, 42n). A circuit performs direct current reduction to improve the signal ratio and reduce the power consumption before sending the received differential current signal directly to the mixer. It should be appreciated that although the direct current reduction circuit is described as being a part of the mixer circuits, it may be implemented as a separate circuit that operates in conjunction with the mixer circuits.

Figure 2:
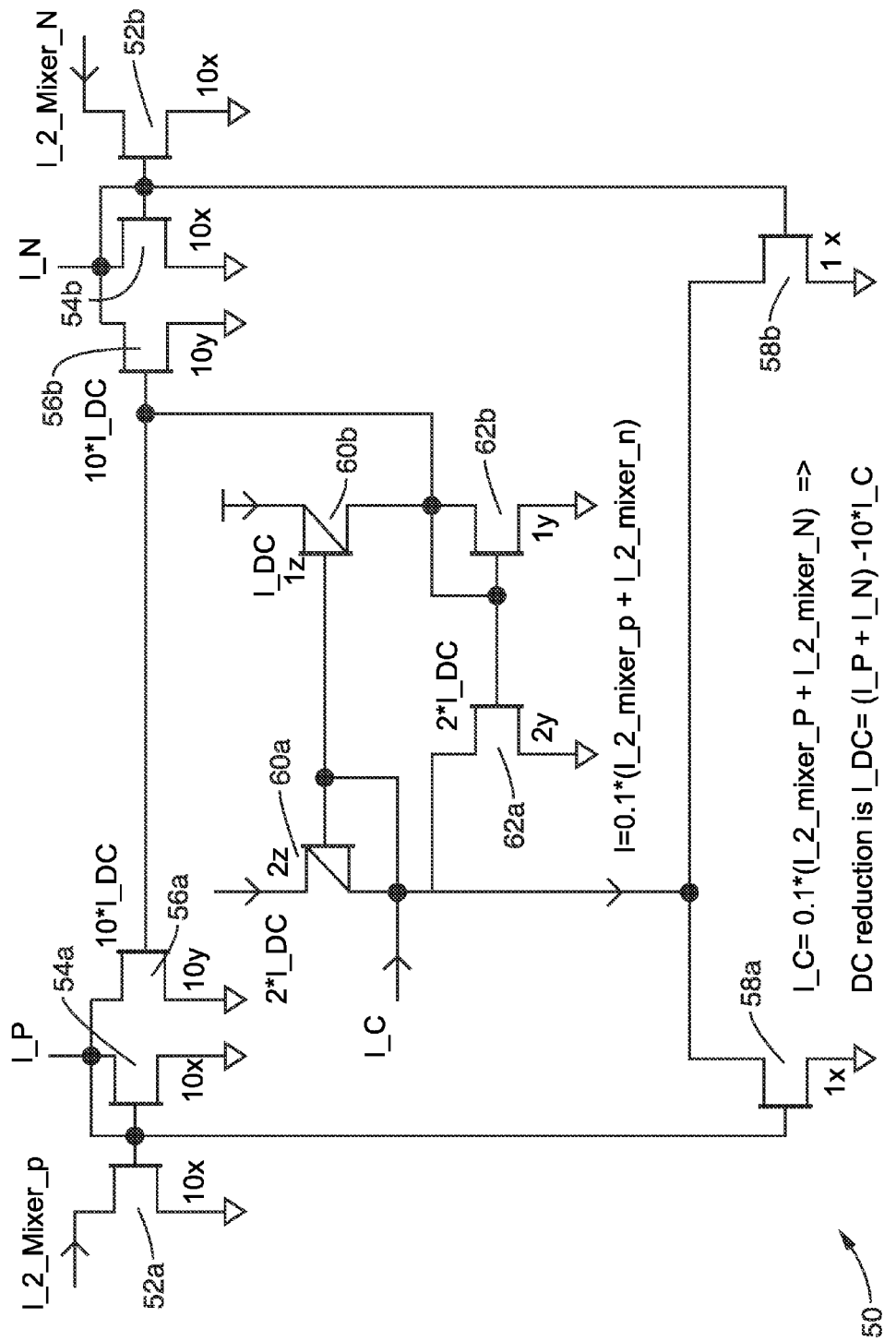
FIG. 2 is a schematic of a direct current reduction circuit utilized according to an embodiment of the present technology.

FIG. 2 illustrates an example embodiment of a direct current reduction circuit 50, which is configured to remove any extra direct current, thus ensuring that the sum of differential currents to the mixer equals 10*I_C. The circuit depicts transistors 52a, 52b at mixer signal inputs I_2_Mixer_p and I_2_Mixer_N operating in combination with transistors 54a, 54b, 56a, 56b in cooperative current mirroring. Schmitt trigger transistors 60a, 60b are seen in a current mirror with partially coupled through current mirror of transistors 62a, 62b, with the current through transistor 60a flowing through a final current mirror of transistors 58a, 58b. This circuit also shows that the amount of direct current removed changes as I_P and I_N changes to ensure the sum of input to mixer remains constant. The constant differential current signal allows a consistent circuit behavior of the mixer.

Figure 3A:
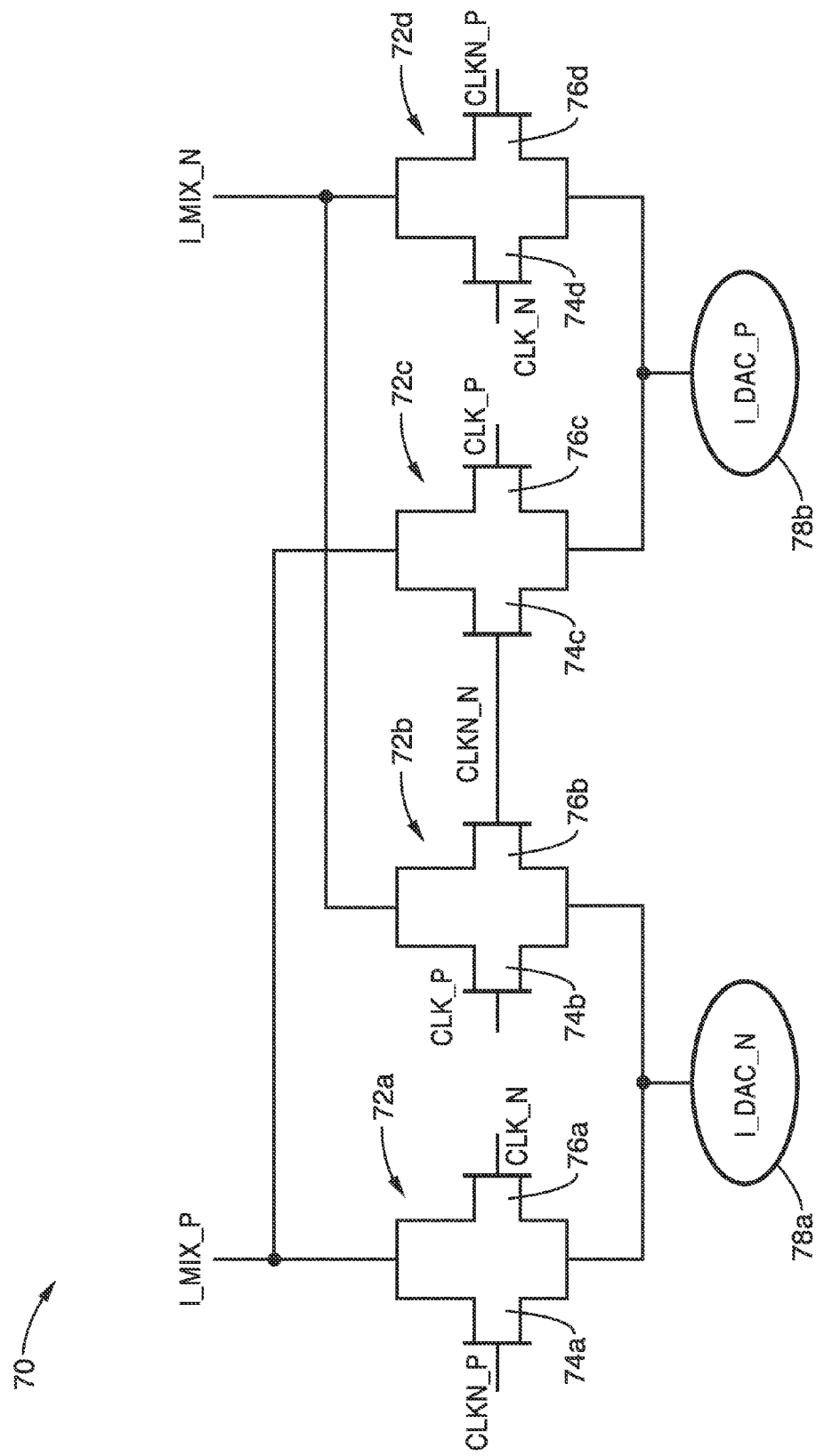
FIG. 3A is a schematic of a differential current steering mixer utilized according to an embodiment of the present technology.

FIG. 3A illustrates an example embodiment 70 of a mixer, having four transistor pairs 72a, 72b, 72c, and 72d. Clock CLKN_P is received at the gate of transistors 74a, 76d, CLK_P is received at the gate of transistors 74b, 76b, CLKN_N is received at the gate of transistors 76b, 74c, CLK_N, are received at gates of transistors 76a, 74d. The mixing carrier is a quarter duty cycle of the digital steering signal. Signal I_MIX_P is coupled to the drains of transistor pair 72a (74a, 76a), and 72c (74c, 76c), while signal I_MIX_N is coupled to the drains of transistor pair 72b (74b, 76b), and 72d (74d, 76d). Outputs from transistor pairs 72a (74a, 76a), and 72b (74b, 76b) comprise I_DAC_N signal 78a, while those from transistor pairs 72c (74c, 76c), and 72d (74d, 76d) comprise I_DAC_P signal 78b.

Figure 3B:
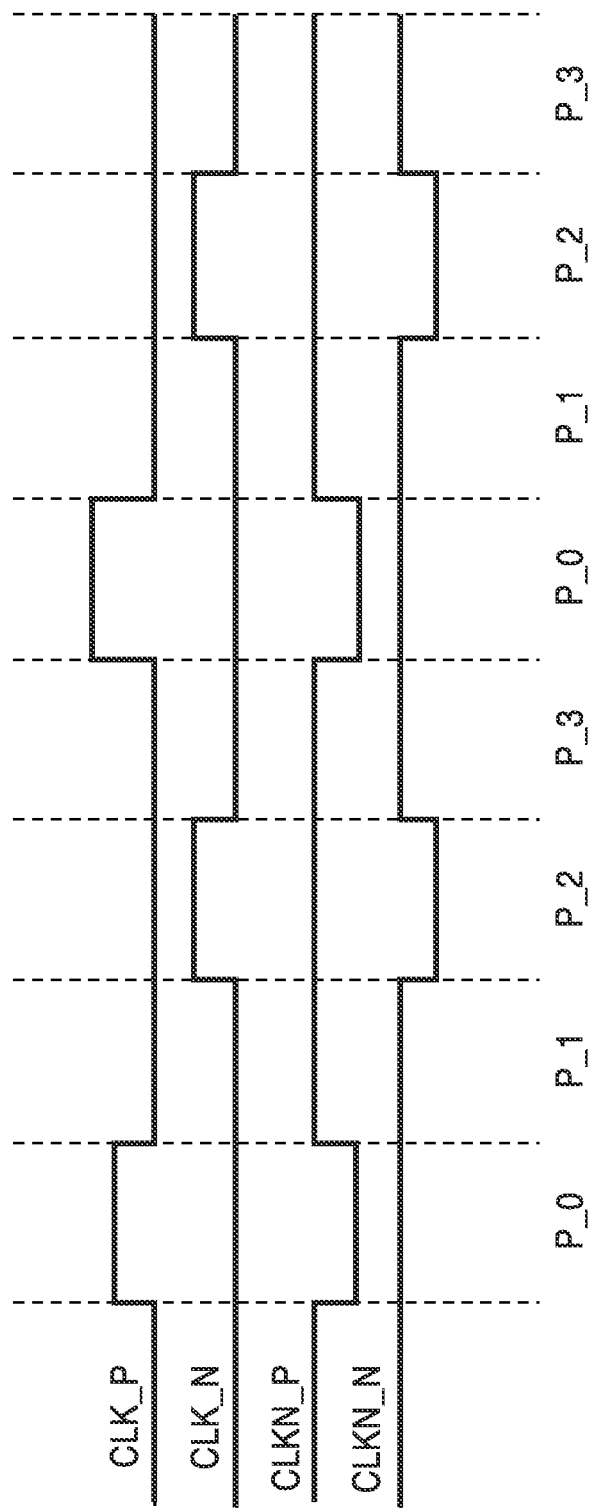
FIG. 3B is a timing/phase diagram of the circuit of FIG. 3A operating according to an embodiment of the present technology.

FIG. 3B illustrates example timing for the mixer of FIG. 3A, showing timing for clock signals CLK_P, CLK_N, CLKN_P, and CLKN_N, in phases P_0, P_1, P_2, and P_3. The mixer timing applies a quarter duty cycle signal so that the circuit avoids interference between I-channel and Q-channel. This, four phase mixing carrier is preferably utilized to maintain fast current steering and avoiding any starvation of current in the differential pair. The four phase carrier operates as the following: during phase P_0, CLK_P and CLK_N are high to make I_MIX_P=I_DAC_P, and I_MIX_N=I_ DAC_N. Phase 0 produces the differential current signal in the same phase of current mode DAC output. During phase 1, CLKN_P and CLKN_N are high to make [I_MIX_P=I_MIX_N=0.5*(I_DAC_P+I_DAC_N)]. Phase 1 produces a differential current signal that is zero. During phase 2, CLK_N and CLKN_P are high to make (I_MIX_P=I_DAC_N, I_MIX_N=I_DAC_P), whereby it produces the differential current signal in 180 degrees of current mode DAC output. During phase 3, CLKN_P and CLKN_N are high to make [I_MIX_P=I_ MIX_N=0.5*(I_ DAC_ P+I_ DAC_N)], thereby producing a differential signal that is zero. The differential current steering mixer is configured so that current will not turn off at any given time, thus avoiding any current spike and thereby reducing any unexpected noise during mixing. Furthermore, the direct current level allows the mixer to operate at high frequency without serious performance degradation.

Referring back to the transmission circuit in FIG. 1, the output pin of the transmitter 12 drives signal 16 from the sum of mixer output signals. It will be appreciated that because the signal is in differential current mode, one can wire all current mirror outputs directly after the mixer. This differential current signal is then passed to receiver circuit 14. The receiver 14 implements a direct current reduction circuit to reduce the direct current level to predefined level. The residue differential current signal will be sent to the demodulation mixer. After demodulation at the mixers, low pass filters can be applied as necessary to filter out adjacent frequency band signals. It should be appreciated that although low-pass filters may be considered to be a part of the mixer circuits, they may be alternatively implemented as separate circuits following the mixer circuits.

It should be appreciated that the signal after low pass filtering is subject to adjacent channel interference and a ripple is generated after the low pass filter. To ensure robust operation with the presence of unwanted ripple, our apparatus preferably applies a hysteresis in the analog-to-digital converter to avoid incorrect signal generation. As this is a differential current signal, it will be noted that the amount of hysteresis can be digitally programmed through the current mirror in the comparators of the analog-to-digital converter.

It should be appreciated that a variety of forms of QAM are available and can be utilized with the present technology, some of the more common forms that can be selected for use include: QAM8, QAM16, QAM32, QAM64, QAM128, and QAM256. It will be appreciated that QAM distributes information in the I-Q plane evenly, and the higher orders of QAM involve information spaced more closely in the constellation. Thus, higher order QAM allows transmitting more bits per symbol, but if the energy of the constellation is to remain the same, the points on the constellation are closer together and the transmission becomes more susceptible to noise. It should also be appreciated that modulation and demodulation can be performed according to the present technology utilizing other forms of multi-frequency analog modulation-demodulation. Examples of other forms of multi-frequency modulation which can be utilized include pulse-width modulation (PWM), frequency-shift keying (FSK), frequency-hopping, spread spectrum, and so forth.

One of ordinary skill in the art will appreciate that the described control signals, including DQS_TX, DM_TX, and the various clock signals such as CLK_SYS, CLK_N, CLK_P, CLKN_P, and CLKN_N can be generated by a control circuit in a variety of ways without departing from the present technology. For example, the use of dedicated digital circuits, timing/oscillator circuits, gate arrays, programmable logic arrays, computer circuits (with associated memory), and other circuitry capable of generating control logic, while combinations of these circuit types may also be utilized without limitation.

The present technology provides a differential current mode operation for modulation and demodulation of a multiple frequency band QAM communication apparatus. In addition to the current mode digital-to-analog converter and analog-to-digital converter, the circuits include four phase quarter duty cycle mixers, a direct current reduction circuit and an adjustable hysteresis circuit provided though current programming. These circuit features ensure a robust, short latency and low power operation.

At least one preferred implementation of our differential current mode modulation-demodulation embodiments is in 28 nm CMOS or further scaled silicon process technology.

From the discussion above it will be appreciated that the technology can be embodied in various ways, including but not limited to the following:

1. An apparatus for performing chip-to-chip communications, comprising: a modulation circuit and a demodulation circuit based on differential current flow, instead of absolute values of current, for communicating between a transmitting chip and a receiving chip; said modulation circuit including a digital-to-analog converter and current mode mixer for each of a plurality of data bits and one or more track pulses, each of said plurality of data bits is converted from a digital signal to an analog differential current and mixed in said current mode mixer with analog differential current outputs for other data bits during multi-frequency modulation in which the differential current is modulated in response to applying a frequency carrier at each of multiple frequencies in different current mode mixers in each modulator circuit; and said demodulation circuit including a current mode mixer and analog-to-digital converter for each of a plurality of data bits and one or more track pulses received from said modulation circuit, whereby a frequency carrier from said multiple frequencies is applied to each current mode mixer in said demodulator to demodulate the analog differential carrier prior to conversion back to a digital signal through said analog-to-digital converter.

2. The apparatus of any of the previous embodiments, wherein a given number of parallel digital data bits in a first integrated circuit chip are converted to a serial current mode analog signal, configured for communication over a single I/O line by said modulator to a demodulator in a second integrated circuit chip which demodulates the analog information back into parallel digital data bits.

3. The apparatus of any of the previous embodiments, wherein said multi-frequency modulation comprises quadrature amplitude modulation (QAM).

4. The apparatus of any of the previous embodiments, wherein said quadrature amplitude modulation (QAM) is selected from the group of QAM orders consisting of QAM8, QAM16, QAM32, QAM64, QAM128 or QAM256.

5. The apparatus of any of the previous embodiments, wherein each said current mode mixer of said modulator, and said demodulator, receives one of at least two analog signals and a modulation carrier.

6. The apparatus of any of the previous embodiments, further comprising a low pass filter, applied in said demodulator after mixing is performed by said current mode mixer, to filter out adjacent frequency band signals.

7. The apparatus of any of the previous embodiments, further comprising introducing hysteresis thresholding in said analog-to-digital converter within said demodulator toward avoiding incorrect signal generation.

8. The apparatus of any of the previous embodiments, wherein said analog-to-digital converter incorporates comparators containing current mirrors and current mode Schmitt Triggers with adjustable hysteresis value for performing said hysteresis thresholding.

9. The apparatus of any of the previous embodiments, further comprising a direct current reduction circuit within said demodulation circuit, said direct current reduction circuit configured to reduce direct current levels, and associated power consumption, prior to sending the received differential current signal to said mixer within said demodulation circuit.

10. The apparatus of any of the previous embodiments, wherein said direct current reduction circuit ensures that the sum of differential current to the current mode mixer is held to a desired threshold.

11. The apparatus of any of the previous embodiments, wherein said current mode mixer utilizes a mixing carrier which is a quarter duty cycle of a digital steering signal utilized in said multi-frequency modulation.

12. The apparatus of any of the previous embodiments, wherein application of said quarter duty cycle signal, avoids interference between channels during multi-frequency modulation.

13. The apparatus of any of the previous embodiments, further comprising a four phase mixing carrier to maintain fast current steering and avoid current starvation of current in differential transistor pairs of said current mode mixer.

14. The apparatus of any of the previous embodiments, wherein said plurality of bits comprise a byte of 8 bits, or other predetermined number of bits.

15. The apparatus of any of the previous embodiments, wherein said chip-to-chip communication distance is at or less than three inches.

16. The apparatus of any of the previous embodiments, wherein said chip-to-chip communications apparatus benefits from reduced power consumption, shorter latency, higher tolerance to interference between neighboring through-silicon-vias and higher tolerance to fabrication process variations than existing voltage signaling regardless of whether it is in single-ended or differential mode.

17. The apparatus of any of the previous embodiments, wherein said apparatus is configured for self-adjusting DC current to remove undesired differential DC current mode toward maintaining enhanced signal-to-background ratio and reduced power consumption.

18. The apparatus of any of the previous embodiments, wherein said self-adjusting of DC current removes undesired DC current components induced by process variations that arise in response to chip fabrication process variations.

19. The apparatus of any of the previous embodiments, wherein input impedance of a chip using said demodulator is lower when operating in said current mode compared with that of voltage mode operations, whereby a chip transmitting using said modulator is subject to lighter loading in current mode operation leading to higher speed communication under a larger capacitance loading.

20. The apparatus of any of the previous embodiments, wherein said demodulator benefits from lower input impedance by using said differential current flow, which is a current mode, and is less sensitive to interference noise generated by neighboring through-silicon-vias (TSVs) which are principally operating in voltage mode, than circuits relying on voltage mode forms of communication.

21. The apparatus of any of the previous embodiments, wherein said apparatus is incorporated within multi frequency band quadrature amplitude modulation (QAM) chip-to-chip transceiver circuits.

22. The apparatus of any of the previous embodiments, wherein said apparatus is applicable to two-dimensional or three-dimensional chip-to-chip integrated circuit connections.

23. The apparatus of any of the previous embodiments, wherein said apparatus is incorporated within an integrated circuit to allow communication between that chip and a multiplicity of other integrated circuit chips, which are located within a short distance that also incorporate the chip-to-chip communications apparatus.

24. The apparatus of any of the previous embodiments, wherein said multiple frequencies comprise at least a first frequency and a second frequency.

25. The apparatus of any of the previous embodiments, wherein said frequency carrier is utilized in quadrature amplitude modulation (QAM) within said modulation circuit and said demodulation circuit and comprises a 90 degree out-of-phase modulation carriers.

26. The apparatus of any of the previous embodiments, wherein each said modulator circuit or demodulator circuit is configured for QAM and has two of said current mode mixers, one for encoding or decoding a Q channel, and for encoding or decoding an I channel.

27. An apparatus for performing chip-to-chip communications, comprising: a modulation circuit and a demodulation circuit based on differential current flow, instead of absolute values of current, for communicating between a transmitting chip and a receiving chip; said modulation circuit comprising a digital-to-analog converter and current mode mixer for each of a plurality of data bits and one or more track pulses, each of said plurality of data bits is converted from a digital signal to an analog differential current and mixed in said current mode mixer with analog differential current outputs for other data bits during multi-frequency modulation in which the differential current is modulated in response to applying a frequency carrier at each of multiple frequencies in different current mode mixers in each modulator circuit; said demodulation circuit comprising a current mode mixer and analog-to-digital converter for each of a plurality of data bits and one or more track pulses received from said modulation circuit, whereby a frequency carrier from said multiple frequencies is applied to each current mode mixer in said demodulator to demodulate the analog differential carrier prior to conversion back to a digital signal through said analog-to-digital converter; and wherein a given number of parallel digital data bits in a first integrated circuit chip are converted to a serial current mode analog signal, configured for communication over a single I/O line by said modulator to a demodulator in a second integrated circuit chip which demodulates the analog information back into parallel digital data bits.

28. An apparatus for performing chip-to-chip communications, comprising: a modulation circuit and a demodulation circuit based on differential current flow, instead of absolute values of current, for communicating between a transmitting chip and a receiving chip; said modulation circuit includes a digital-to-analog converter and current mode mixer performing quadrature amplitude modulation (QAM) for each of a plurality of data bits and one or more track pulses, each of said plurality of data bits is converted from a digital signal to an analog differential current and mixed in said current mode mixer with analog differential current outputs for other data bits during multi-frequency modulation in which the differential current is modulated in response to applying a frequency carrier at each of multiple frequencies in different current mode mixers in each modulator circuit; said demodulation circuit including a current mode mixer performing quadrature amplitude demodulation (QAM) and analog-to-digital converter for each of a plurality of data bits and one or more track pulses received from said modulation circuit, whereby a frequency carrier from said multiple frequencies is applied to each current mode mixer in said demodulator to demodulate the analog differential carrier prior to conversion back to a digital signal through said analog-to-digital converter; and wherein a given number of parallel digital data bits in a first integrated circuit chip are converted to a serial current mode analog signal, configured for communication over a single I/O line by said modulator to a demodulator in a second integrated circuit chip which demodulates the analog information back into parallel digital data bits.

Although the description above contains many details, these should not be construed as limiting the scope of the technology but as merely providing illustrations of some of the presently preferred embodiments of this technology. Therefore, it will be appreciated that the scope of the technology fully encompasses other embodiments which may become obvious to those skilled in the art, and that the scope of the technology is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology, for it to be encompassed by the present claims. Furthermore, no element, component, or method step described herein is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for performing chip-to-chip communications, comprising:
   a modulation circuit and a demodulation circuit based on differential current flow, for communicating between a transmitting chip and a receiving chip;
   said modulation circuit including a digital-to-analog converter and current mode mixer for each of a plurality of data bits and one or more track pulses, each of said plurality of data bits is converted from a digital signal to an analog differential current and mixed in said current mode mixer with analog differential current outputs for other data bits during multi-frequency modulation in which the differential current is modulated in response to applying a frequency carrier at each of multiple frequencies in different current mode mixers in each said modulation circuit; and
   said demodulation circuit including a current mode mixer and analog-to-digital converter for each of a plurality of data bits and one or more track pulses received from said modulation circuit, whereby a frequency carrier from said multiple frequencies is applied to each current mode mixer in said demodulation circuit to demodulate the analog differential carrier prior to conversion back to a digital signal through said analog-to-digital converter.

2. The apparatus recited in claim 1, wherein said apparatus is configured for converting a given number of parallel digital data bits in a first integrated circuit chip to a serial current mode analog signal, configured for communication over a single I/O line by said modulation circuit to said demodulation circuit in a second integrated circuit chip which demodulates the analog information back into parallel digital data bits.

3. The apparatus recited in claim 1, wherein said multi-frequency modulation comprises quadrature amplitude modulation (QAM).

4. The apparatus recited in claim 3, wherein said quadrature amplitude modulation (QAM) is selected from the group of QAM orders consisting of QAM8, QAM16, QAM32, QAM64, QAM128 or QAM256.

5. The apparatus recited in claim 1, wherein each said current mode mixer of said modulation circuit, and said demodulation circuit, receives one of at least two analog signals and a modulation carrier.

6. The apparatus recited in claim 1, further comprising a low pass filter, applied in said demodulation circuit after mixing is performed by said current mode mixer, to filter out adjacent frequency band signals.

7. The apparatus recited in claim 1, further comprising introducing hysteresis thresholding in said analog-to-digital converter within said demodulation circuit toward avoiding incorrect signal generation.

8. The apparatus recited in claim 7, wherein said analog-to-digital converter incorporates comparators containing current mirrors and current mode Schmitt Triggers with adjustable hysteresis value for performing said hysteresis thresholding.

9. The apparatus recited in claim 1, further comprising a direct current reduction circuit within said demodulation circuit, said direct current reduction circuit configured to reduce direct current levels, and associated power consumption, prior to sending the received differential current signal to said mixer within said demodulation circuit.

10. The apparatus recited in claim 9, wherein said direct current reduction circuit ensures that the sum of differential current to the current mode mixer is held to a desired threshold.

11. The apparatus recited in claim 1, wherein said current mode mixer utilizes a mixing carrier which is a quarter duty cycle of a digital steering signal utilized in said multi-frequency modulation.

12. The apparatus recited in claim 11, wherein application of said quarter duty cycle signal, avoids interference between channels during multi-frequency modulation.

13. The apparatus recited in claim 11, further comprising a four phase mixing carrier to maintain fast current steering and avoid current starvation of current in differential transistor pairs of said current mode mixer.

14. The apparatus recited in claim 1, wherein said plurality of bits comprise a byte of 8 bits, or other predetermined number of bits.

15. The apparatus recited in claim 1, wherein said chip-to-chip communication distance is at or less than three inches.

16. The apparatus recited in claim 1, further comprising a self-adjusting DC reduction circuit configured to remove undesired differential DC current mode toward maintaining enhanced signal-to-background ratio and reduced power consumption.

17. The apparatus recited in claim 1, wherein said apparatus is incorporated within multi frequency band quadrature amplitude modulation (QAM) chip-to-chip transceiver circuits.

18. The apparatus recited in claim 1, wherein said apparatus is configured for establishing two-dimensional or three-dimensional chip-to-chip integrated circuit connections.

19. The apparatus recited in claim 1, wherein said apparatus is configured for incorporation within an integrated circuit chip to allow communication between that integrated circuit chip and a multiplicity of other integrated circuit chips, which are located within a short distance that also incorporate said apparatus for performing chip-to-chip communications apparatus.

20. The apparatus recited in claim 1, wherein said multiple frequencies comprise at least a first frequency and a second frequency.

21. The apparatus recited in claim 1, wherein said frequency carrier is utilized in quadrature amplitude modulation (QAM) within said modulation circuit and said demodulation circuit and comprises a 90 degree out-of-phase modulation carrier.

22. The apparatus recited in claim 1, wherein each said modulation circuit or demodulation circuit is configured for QAM and has two of said current mode mixers, one for encoding or decoding a Q channel, and for encoding or decoding an I channel.

23. An apparatus for performing chip-to-chip communications, comprising:
 a modulation circuit and a demodulation circuit based on differential current flow, instead of absolute values of current, for communicating between a transmitting chip and a receiving chip;
 said modulation circuit comprising a digital-to-analog converter and current mode mixer for each of a plurality of data bits and one or more track pulses, each of said plurality of data bits is converted from a digital signal to an analog differential current and mixed in said current mode mixer with analog differential current outputs for other data bits during multi-frequency modulation in which the differential current is modulated in response to applying a frequency carrier at each of multiple frequencies in different current mode mixers in each modulation circuit;
 wherein said multi-frequency modulation comprises quadrature amplitude modulation (QAM);
 said demodulation circuit comprising a current mode mixer and analog-to-digital converter for each of a plurality of data bits and one or more track pulses received from said modulation circuit, whereby a frequency carrier from said multiple frequencies is applied to each current mode mixer in said demodulation circuit to demodulate the analog differential carrier prior to conversion back to a digital signal through said analog-to-digital converter; and
 wherein a given number of parallel digital data bits in a first integrated circuit chip are converted to a serial current mode analog signal, configured for communication over a single I/O line by said modulation circuit to said demodulation circuit in a second integrated circuit chip which demodulates the analog information back into parallel digital data bits.

24. An apparatus for performing chip-to-chip communications, comprising:

a modulation circuit and a demodulation circuit based on differential current flow, for communicating between a transmitting chip and a receiving chip;

said modulation circuit includes a digital-to-analog converter and current mode mixer performing quadrature amplitude modulation (QAM) for each of a plurality of data bits and one or more track pulses, each of said plurality of data bits is converted from a digital signal to an analog differential current and mixed in said current mode mixer with analog differential current outputs for other data bits during multi-frequency modulation in which the differential current is modulated in response to applying a frequency carrier at each of multiple frequencies in different current mode mixers in each said modulation circuit;

said demodulation circuit including a current mode mixer performing quadrature amplitude demodulation (QAM) and analog-to-digital converter for each of a plurality of data bits and one or more track pulses received from said modulation circuit, whereby a frequency carrier from said multiple frequencies is applied to each current mode mixer in said demodulation circuit to demodulate the analog differential carrier prior to conversion back to a digital signal through said analog-to-digital converter; and wherein a given number of parallel digital data bits in a first integrated circuit chip are converted to a serial current mode analog signal, configured for communication over a single I/O line by said modulation circuit to said demodulation circuit in a second integrated circuit chip which demodulates the analog information back into parallel digital data bits.

* * * * *